United States Patent [19]

Coupland

[11] 4,010,983
[45] Mar. 8, 1977

[54] DUAL BRAKE CIRCUIT VALVE ASSEMBLY

[75] Inventor: Ralph Coupland, Lincoln, England

[73] Assignee: Clayton Dewandre Company Limited, Lincoln, England

[22] Filed: May 29, 1975

[21] Appl. No.: 581,846

[30] Foreign Application Priority Data

June 13, 1974 United Kingdom ............ 26285/74

[52] U.S. Cl. .................. 303/40; 137/627.5; 303/52

[51] Int. Cl.² ........................... B60T 15/12

[58] Field of Search ............... 303/9, 13, 6 R, 69, 303/29, 40, 50, 52, 54, 68, 56, 56 X; 137/627.5

[56] References Cited

UNITED STATES PATENTS

| | | | |
|---|---|---|---|
| 1,874,297 | 8/1932 | Ives | 303/54 |
| 3,507,545 | 4/1970 | Page et al. | 303/52 |
| 3,580,646 | 5/1971 | Ternent | 303/52 |
| 3,606,494 | 9/1971 | Frank et al. | 303/52 |
| 3,712,685 | 1/1973 | Hoffmann | 303/54 X |

*Primary Examiner*—Trygve M. Blix
*Assistant Examiner*—Douglas C. Butler
*Attorney, Agent, or Firm*—Norris & Bateman

[57] ABSTRACT

A dual brake valve for use in a twin-circuit fluid pressure-operated vehicle braking system comprises a housing, two sets of ports therein each including an inlet port and a delivery port, and two co-axial valve assemblies associated respectively with the two sets of ports, the valve assemblies each comprising a poppet-type valve element the head of which is subjected to delivery pressure, which pressure also acts on an oppositely-directed face of the valve element such that fluid pressure across the valve element is balanced. Preferably an axial exhaust passage is provided in part by a tubular member located co-axially between the valve assemblies by a diaphragm assembly which is also subjected to delivery pressure on both sides thereof.

2 Claims, 1 Drawing Figure

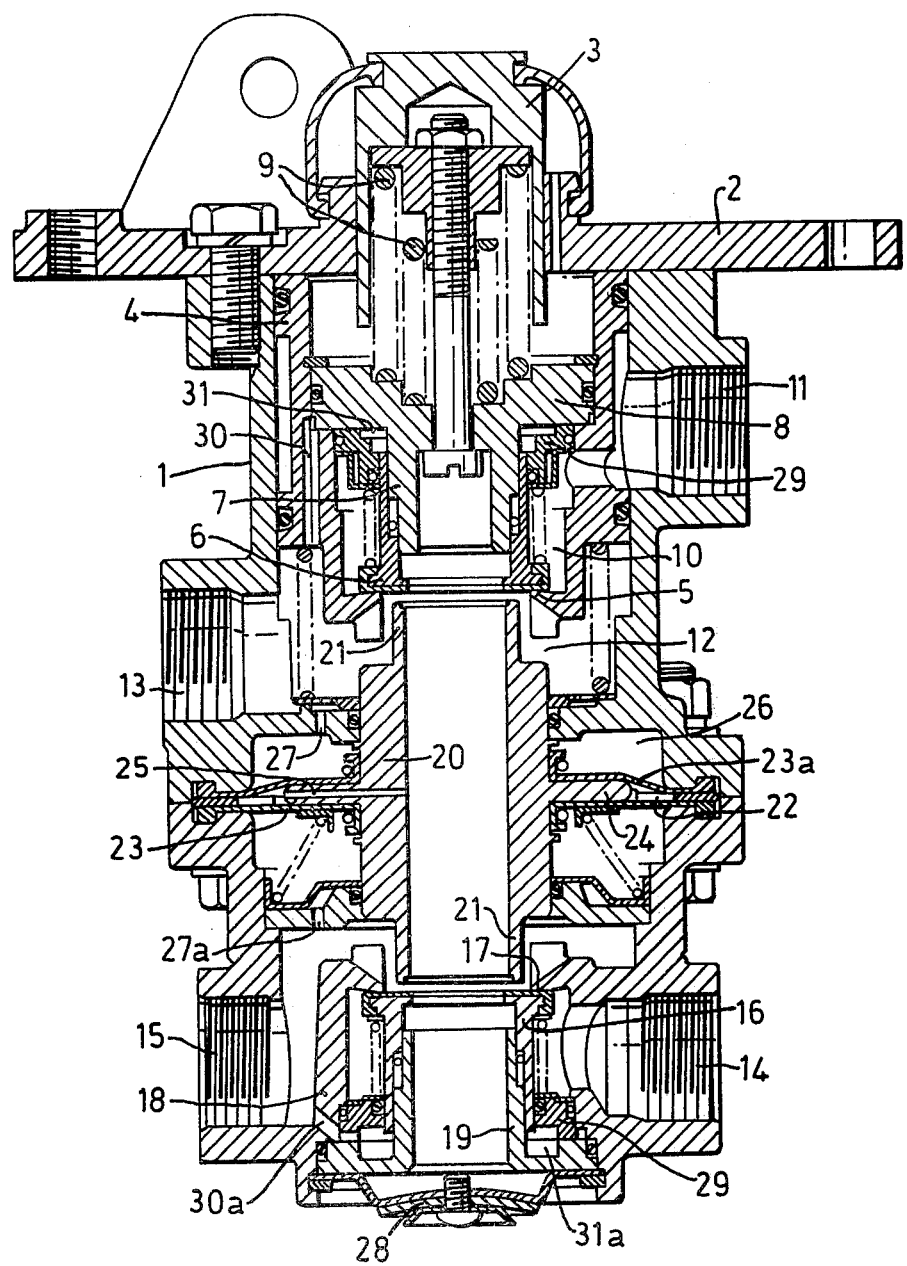

DUAL BRAKE CIRCUIT VALVE ASSEMBLY

This invention relates to dual brake valves for use in fluid pressure-operated vehicle braking apparatus embodying two independent braking circuits, the invention having particular reference to valves of the kind comprising a housing provided with two sets of ports associated respectively with the two braking circuits and each consisting of an air inlet or supply port and an outlet or delivery port and, associated respectively with said set of ports, two co-axial valve assemblies which are operative when actuated to seal off the delivery ports from exhaust and connect them to the related inlet ports. The main object of the present invention is to improve the performance of dual brake valves of this type by reducing the "crack-off" effort and the hysterisis of the valve to a minimum. A further object of the invention is to reduce the operating differential pressures between the two valve outputs to a negligible amount. This has been achieved by reducing the friction of the moving parts of the opposing valves to a minimum, and ensuring that the opposing diaphragm areas are exactly balanced at all pressures.

According to the invention the valve assemblies each comprise a poppet-type valve element co-acting with an annular seat and subjected to delivery pressure on its head, delivery pressure also being conducted to an oppositely-directed face of the valve element such that it balances the fluid pressure acting on the valve head. Thus the "crack-off" effort is only that necessary to overcome the light spring-loading of the valve element and the hysterisis figure of the valve is lowered.

In a preferred construction, an exhaust valve structure located co-axially between the valve assemblies also co-acts with the heads of the said valve elements and is attached to a diaphragm structure which is also balanced by being subjected to delivery pressures at opposite sides thereof and such embodiment will now be described in more detail and with reference to the accompanying drawing which is an axial sectional view through the valve.

The drawing illustrates the invention according to a preferred embodiment.

The valve shown comprises a vertically-disposed cylindrical housing 1 in the cover 2 of which is supported an axially-displaceable thrust member 3 adapted to be actuated by a foot pedal (not shown). Having a sealed sliding fit in the upper end of the housing is a sleeve-like seating structure 4, the lower end of which has an inwardly-directed flange formed on its upper side with an annular seat 5, engageable by the head of a rubber-faced poppet-type inlet valve element 6. The valve element 6 has a sliding fit on a stem 7 of a piston-like member 8 which is clamped within the seating structure for movement therewith, a travel spring assembly 9 being interposed between the piston member 8 and the thrust member 3 and through which the thrust of the foot pedal is transmitted to the combined piston/seating structure 4, 5. The space 10 above the annular seat 5 communicates with an inlet port 11 in the housing wall whilst the space 12 below said seat communicates with a delivery port 13 in said wall, these ports being associated with one of the braking circuits. At the lower end of the housing there is provided a second inlet valve assembly of similar construction controlling communication between an inlet port 14 and a delivery port 15 connected into the second braking circuit, the head of the valve element 16 in this instance engaging a seat 17 on the upper end of a seating structure 18 which is fixed, preferably by forming it integral with the housing. The valve element 16 slides upon a tubular guide 19 which is secured within the lower part of the housing structure.

Located between the two valve assemblies is a co-axially disposed tubular structure 20 the ends of which constitute annular exhaust valve elements 21 and co-act respectively with the heads of the inlet valves 6, 16 on a smaller diameter than does the inlet valve seats 5, 17. Attached to the exhaust valve structure at its mid point and located thereby is an annular diaphragm assembly 22 which is secured at its periphery to the housing, e.g. by forming the housing in two parts and clamping the diaphragm assembly between them. Preferably, the diaphragm assembly consists of two annular diaphragms 23, 23a spaced by a flange 24 on the exhaust valve structure 20, the space between the diaphragms being vented to the interior of said structure through a passage 25 in the flange 24 in order to detect a diaphragm failure. The diaphragm assembly is disposed in a chamber 26 formed in the housing, the spaces at opposite sides of said assembly communicating respectively and by passages 27, 27a in the housing with the two delivery ports 13, 15.

The bores of the exhaust valve structure 20, of the lower inlet valve 16 and of its tubular guide 19 form collectively an axial exhaust passage in permanent communication at its lower end with atmosphere via a check valve 28 and the dual brake valve as so far described operates as follows:

Normally the heads of the inlet valves 6, 16 engage their seats 5, 17 but are spaced from the exhaust valve elements 21 whereby the inlet ports 11, 14 are sealed off but the delivery ports 13, 15 are in communication with the axial exhaust passage. Depression of the foot pedal acting through the travel spring assembly 9 displaces the combined piston and seating structure 4, 8 taking with it the upper inlet valve 6 which is spring loaded on to its seat 5. This inlet valve 6 then engages the tubular exhaust structure and displaces it into engagement with the lower inlet valve 16. The tubular exhaust structure 20 is disposed between adjacent ends of the valves 6 and 16 and thereby in operation acts as a thrust member transmitting force between valve 6 and valve 16. Thus the axial exhaust passage is shut off from both delivery ports and upon continued depression of the foot pedal the seat 5 at the upper end of the housing moves away from the associated inlet valve 6 whilst at the lower end of the housing, the inlet valve 16 is moved off its co-acting seat 17 by the displaced exhaust valve structure whereby both inlet ports are then connected to their related delivery ports and air under pressure is conducted to the brakes.

With the above described construction the annular area of each inlet valve head between the areas engaged by the seat 5 (17) on the seating structure and by the exhaust valve 21 is subjected to delivery pressure and this could produce undesirable loading of the valve element. A feature of the present invention is the provision of means for balancing this loading and for this purpose there is provided on the end of each valve element remote from its head a small annular piston 29 having sealing sliding engagement with the seating structure and, in the wall of said structure, a passage 30, 30a connecting the related delivery port to the space 31, 31a behind said piston. Thus delivery pressures on the valve elements are balanced and the performance of the valve is improved.

As previously mentioned the opposite sides of the diaphragm assembly locating the tubular exhaust valve structure are also responsive to pressures in the two delivery ports respectively so that here too delivery pressures across the exhaust assembly are balanced and the assembly exerts no undesirable loading on the valve.

I claim:

1. A dual brake system valve assembly comprising a housing provided with respective sets of fluid pressure inlet and delivery ports connected into respective braking circuits, means defining passages within the housing between the inlet and delivery ports on each set, a poppet type valve member in each passage, said valve members being slidably mounted in coaxial relation within said housing and having adjacent one ends, means biasing said valve members to close pressure transmitting communication between the ports of each set through their respective associated passages, operating means for substantially simultaneously displacing said valve members to interconnect the related inlet and delivery ports in pressure transmitting communication through their respective passages for actuating brakes in the respective circuits, said operating means including a thrust member disposed between said adjacent one ends of said valve members, and means whereby during brake actuation the delivery pressure in each passage is applied in force balancing relation to non-adjacent end areas of the associated valve member, said thrust member comprising a tubular exhaust valve structure disposed coaxially between said two valve members and mounted by a diaphragm assembly, and spaced at opposite sides of the diaphragm assembly being connected respectively to the two delivery ports so that effective delivery pressures across the exhaust valve structure are balanced.

2. A dual brake valve system as claimed in claim 1, wherein said diaphragm assembly comprises two annular diaphragms spaced by a flange on the exhaust valve structure, the space between the diaphragms being vented through a passage in the flange to the interior of said structure.

* * * * *